United States Patent [19]

Wertheim

[11] Patent Number: 5,746,004
[45] Date of Patent: May 5, 1998

[54] TAPE RULE HOUSING

[75] Inventor: Gregory D. Wertheim, Coventry, Conn.

[73] Assignee: The Stanley Works, New Britain, Conn.

[21] Appl. No.: 703,962

[22] Filed: Aug. 28, 1996

[51] Int. Cl.$^6$ ........................................ G01B 3/10
[52] U.S. Cl. ................................... 33/768; 33/769
[58] Field of Search ........................ 33/761, 768, 769

[56] References Cited

U.S. PATENT DOCUMENTS

| D. 332,414 | 1/1993 | Bordenave . | |
|---|---|---|---|
| D. 364,575 | 11/1995 | Goldner . | |
| 2,914,269 | 11/1959 | Freeman | 33/761 |
| 3,141,628 | 7/1964 | Evans et al. | 33/769 |
| 3,216,117 | 11/1965 | Stowell | 33/769 |
| 4,142,693 | 3/1979 | Czerwinski | 33/769 |
| 4,527,334 | 7/1985 | Jones et al. | 33/761 |
| 5,379,523 | 1/1995 | Wingert | 33/769 |
| 5,396,578 | 3/1995 | Howes . | |

FOREIGN PATENT DOCUMENTS 1051865  12/1966  United Kingdom ............. 33/769

*Primary Examiner*—Thomas B. Will
*Attorney, Agent, or Firm*—Pepe & Hazard LLP

[57] ABSTRACT

A returnable tape rule housing has a generally convexly arcuate juncture between the side walls and the upper portion of the peripheral wall upon which is an elastomeric grip element which provides a slip-resistant and comfortable gripping surface for the user's palm and thumb. The housing may also have textured surfaces on the lower portion of its side walls to enhance gripping.

13 Claims, 2 Drawing Sheets

TAPE RULE HOUSING

BACKGROUND OF THE INVENTION

The present invention relates to coilable tape rules, and more particularly, to a housing for such tape rules having improved gripping characteristics to minimize slipping from a user's hand.

Spring powered coilable metal tape rules are widely employed to facilitate measurement and return of the extended tape into the casing for storage and carrying purposes. Many tape rule housings are formed from mating sections with configuration which are roughly square or rectangular, and the corners of the housing are utilized for the placement of screws which hold the housing together. However, the squared off corners of such housings do not fit comfortably within the palm of the hand.

Eliminating a screw at the upper back corner of the housing permits rounding of the upper back corner to provide a configuration which fits better in the palm of the hand. Although this configuration feels more comfortable in the hand, the arcuate shape of the housing tends to make it slide forwardly in the hand, and makes it easier for the operator to lose his or her grip on the housing.

It is an object of the present invention to provide a coilable tape rule housing having a novel gripping surface which limits the tendency for slipping out of the user's hand.

Another object is to provide such a coilable tape rule housing on which are provided multiple gripping surfaces.

It is also an object to provide such a coilable tape rule in which the elements may be simply and readily fabricated and assembled.

SUMMARY OF THE INVENTION

It has now been found that the foregoing and related objects may be readily attained in a returnable tape rule housing which has side walls and a peripheral wall extending therebetween and which provide an internal chamber therein. The peripheral wall has bottom, upper, front end and rear end portions, and it has an aperture therein communicating with the chamber at the juncture between the bottom portion and the front end portion for passage of a tape rule blade therethrough. The juncture between the side walls and the upper portion of the peripheral wall are generally convexly arcuate, and an elastomeric grip element on the peripheral wall extends over the upper section of the rear end portion and the rearward section of the upper portion, to provide a slip-resistant and comfortable gripping surface for the user's palm and thumb.

Generally, the grip element also extends over a portion of the side walls adjacent to the peripheral wall portions over which it extends, and it also extends from approximately the middle of the rear end portion of the peripheral wall to approximately the middle of the upper portion of the peripheral wall. Preferably, the grip element has ribs extending transversely of the peripheral wall and spaced along the length thereof, and is adhesively bonded to the peripheral wall.

Desirably, the peripheral wall and side walls have recessed portions in which the grip element is seated, and the housing walls are fabricated from synthetic resin. The side walls also have a textured grip surface extending over a portion thereof adjacent the bottom portion of the peripheral wall.

Generally, the side walls and peripheral wall of the housing are provided by a pair of mating housing elements, and the housing elements are molded with recessed portions on the side walls and peripheral wall in which the grip element is seated.

Preferably, the grip element is comprised of a pair of cooperatively configured and dimensioned sections seated in the recessed portions and bonded thereto, and the grip sections are overmolded in the recessed portions of the housing elements.

DETAILED DESCRIPTION OF THE PREFERRED EMBODIMENT

Figure 1:
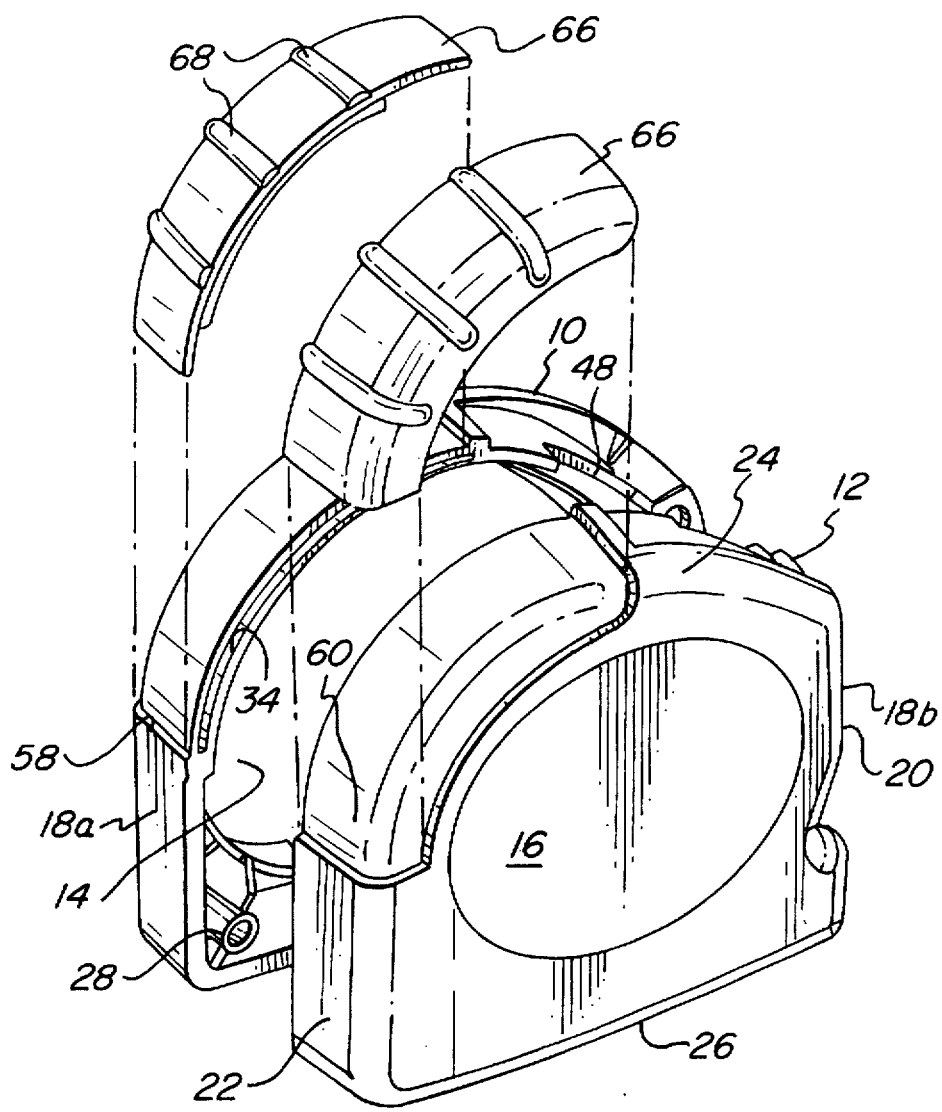
FIG. 1 is a partially exploded view of a tape rule housing embodying the present invention.

Turning first to FIG. 1 of the attached drawings, therein illustrated is a power returnable tape rule housing embodying the present invention and comprised of two mating sections generally designated by numerals 10, 12 which, when assembled, provide a cavity 14 within which is seated the coiled tape and spring 36 seated on drum 40.

Each housing section 10,12 has a side wall 16 and a peripheral wall 18a, 18b extending thereabout, and the peripheral walls 18 interfit when assembled. The peripheral wall 18 includes a front end portion 20, a rear end portion 22, a top portion 24 and bottom portion 26. The top portion 24 is convexly arcuate and the bottom portion 26 is generally rectilinear. The upper portions of the front end portion 20 and rear end portion 22 are also convexly arcuate to blend into the curvature of the top portion 24. At the arcuate juncture of the rear end and top portions 22, 24 each of the housing sections 10, 12 has a recess 60 bounded on three sides by a shoulder 58, and the recess 60 extends over the peripheral wall from a point adjacent the middle of the rear end portion 22 to the middle of the top portion 24 and over a portion of the side walls 16 adjacent thereto. For symmetry, the portion of the recess 60 in the side walls 16 is also convex.

Figure 2:
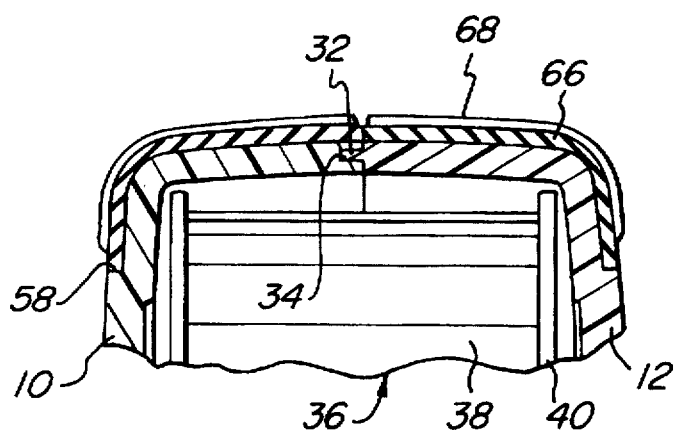
FIG. 2 is a fragmentary sectional view of the assembled housing along the line 2—2 of FIG. 4 and drawn to an enlarged scale.

As illustrated in FIGS. 1 and 2, a tongue 32 and groove 34 are provided along the edges of the peripheral wall portions 18a, 18b of the sections 10, 12 respectively. The assembled tape rule will include a cartridge (not shown) seated within the cavity 14.

Figure 3:
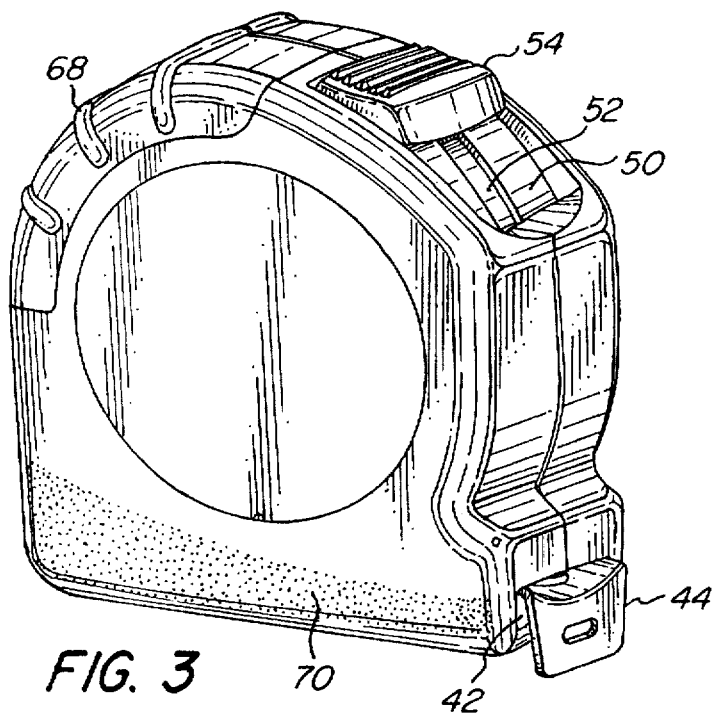
FIG. 3 is a perspective view of an assembled coilable metal tape rule of FIG. 1 with the end of tape extending outwardly therefrom and a lock button seated thereon.

As illustrated in FIG. 3, the front end wall portion 20 of the casing sections 10, 12 has an aperture 42 formed at the juncture between the front end wall portion 20 and the bottom wall portion 26. The tape rule blade 38 extends therethrough and has a downwardly depending tape hook 44 on its outer front end wall portion 20.

In the peripheral wall 18 at the juncture of the top portion 24 with the front end portion 20 is a recess 50 and notches 48 in the interfitting edges. These provide a channel 52 in which is slidable the lock button 54 which has ribs 56 on its upper surface to enhance gripping thereof.

Figure 4:
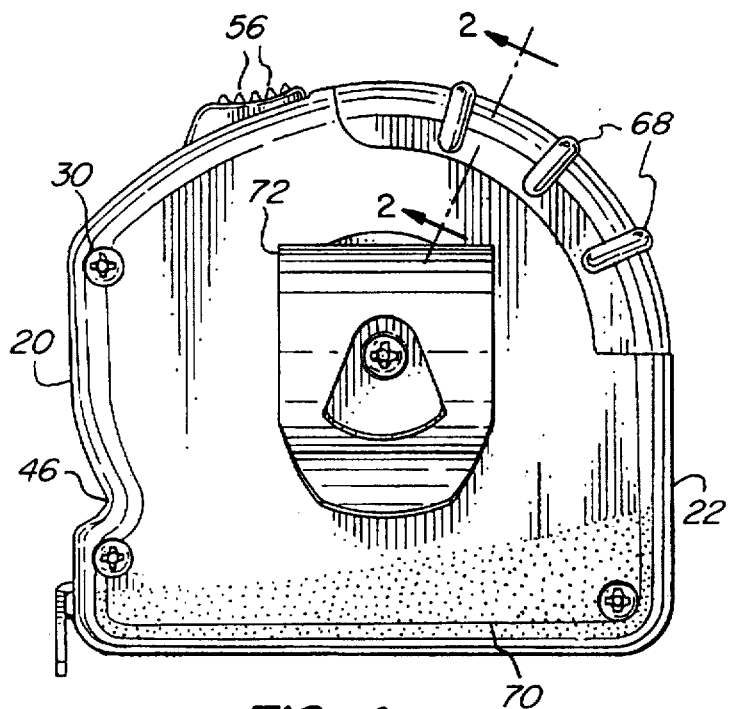
FIG. 4 is a side elevational view of the tape rule of FIG. 3 looking at the opposite side and upon which is a mounting clip.

As illustrated in FIG. 4, three fasteners 30 seat in countersunk apertures in the casing section 20 and threadably engage in bosses 28 of the casing section 12 to lock the casing sections 10, 12 together. The fasteners 30 are located at three of the four corners of the tape rule housing, and the tongue 32 and groove 34 joint extends along the remaining fourth corner. A belt clip 72 is mounted on the center of the side wall 16 of the housing which is mounted by an additional fastener 30.

A symmetrical pair of elongated arcuate grip elements 66 is seated in the arcuate recesses 60 of the casing sections 10, 12 above the joint provided by the tongue 32 and groove 34. As illustrated in FIG. 2, the thickness of the grip elements 66 is equivalent to the depth of the recesses 60 so that when assembled, the grip elements 66 are substantially coplanar with the adjacent outer surfaces of the casing sections 10, 12. The grip elements 66 are generally L-shaped cross section and extend across the width of the peripheral wall 18, around the rounded edge formed at the juncture of the peripheral wall 18 and the side walls 16, and into the adjacent portion of the side walls 16.

A series of transversely extending ribs 68 are integrally formed upon the outer surface of the grip elements 66 to enhance gripping. The ribs 68 extend across the full width of the grip elements above the plane of the circumferential wall 18 and outwardly of the plane of the side walls 16 so that the palm of the user's hand is firmly in contact therewith.

The grip elements 66 are formed from an elastomeric material of a relatively soft durometer to provide a non-slip surface to enhance gripping even when the palm of the hand is greasy or wet. The grip elements 66 conveniently are overmolded into the recesses 60 of the housing sections 10, 12 to effect convenient formation thereof and concurrent adhesive bonding. If the elastomer is of a composition which does not bond to the material of the housing during molding, an adhesive may be applied to the surface of the housing before overmolding or the grip elements may be separately molded and then affixed to the housing elements by adhesive.

Figure 5:
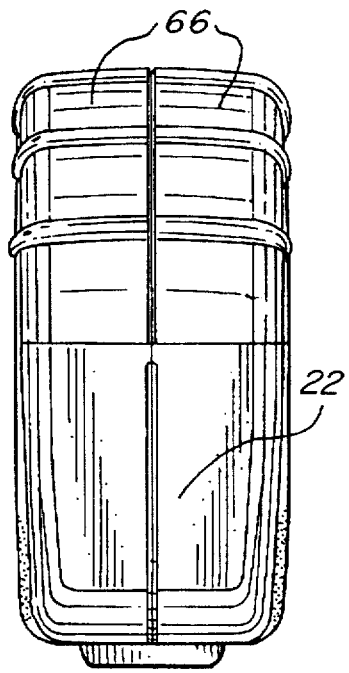
FIG. 5 is a rear elevational view thereof.

The portions of the casing sections 10,12 adjacent the bottom wall 26 is generally rectangular to facilitate stable seating on a support surface, and the side walls 16 are textured as indicated by the stippling in FIGS. 3–5 to provide grip surfaces 70 extending along the length of the side walls 16 from the front portion wall 24 to the rear end portion 26. In contrast to the separate grip sections 66, the grip surfaces 70 are formed or molded into an integral part of the surface of the casing elements 10, 12.

The housing sections 10, 12 are conveniently molded from rugged, impact resistant resins such as ABS (acrylonitrile/butadiene/styrene) acetal, polypropylene, and polycarbonate. Other resins and metals may also be employed.

The elastomer used for the grip elements should have a durometer of about 60–80 and exhibit reasonable resistance to degradation by grease and dirt. Exemplary of such elastomers are polyurethanes, polyisoprenes and polybutylenes. A preferred elastomer because of its ability to bond to an ABS housing in an overmolding operation is an elastomeric thermoplastic polyurethane sold by Dow Chemical under the trademark "PELLETHANE 2103"

In operation, a user grasps the tape rule housing as follows: (i) the operator's thumb is placed upon the lock button 54 in contact with the ribs 56; (ii) the ball of the palm beneath the thumb is placed against the arcuate grip elements 66; (iii) the index finger is placed in the recess 46 in front of the tape rule; and (iv) the remaining fingers bear against the textured grip surfaces 70 on the opposite side of the housing.

Thus, it can be seen from the foregoing detailed description and accompanying drawings that the novel tape rule housing of the present invention provides highly effective gripping surfaces for ease in handling of the tape rule and may be fabricated from durable components and readily assembled to provide a long-lived structure.

Having thus described the invention, what is claimed is:

1. A returnable tape rule housing comprising:

(a) side walls;

(b) a peripheral wall extending therebetween with a bottom portion, upper portion, front end portion, and rear end portion, said walls providing an internal chamber therewithin, said peripheral wall having an aperture therein communicating with said chamber at the juncture between said bottom portion and said front end portion for passage of a tape rule blade therethrough, the juncture between said side walls and said upper portion of said peripheral wall being generally convexly arcuate, said housing walls having recessed portions extending over-the upper section of said rear end portion and the rearward section of said upper portion of said peripheral wall and in the adjacent portions of said sidewalls; and (c) an elastomeric grip element seated in said recessed portions and extending over the upper section of said rear end portion and the rearward section of said upper portion of said peripheral wall and adjacent said portions of said side wall, said grip element providing a slip-resistant and comfortable gripping surface for the user's palm and thumb.

2. The tape rule housing in accordance with claim 1 wherein said grip element extends from approximately the middle of said rear end portion of said peripheral wall to approximately the middle of said upper portion of said peripheral wall.

3. The tape rule housing in accordance with claim 1 wherein said grip element has ribs extending transversely of said peripheral wall and spaced along the length thereof.

4. The tape rule housing in accordance with claim 1 wherein said grip element is adhesively bonded to said peripheral wall.

5. The tape rule housing in accordance with claim 1 wherein said side walls have a textured grip surface extending over a portion thereof adjacent said bottom portion of said peripheral wall.

6. The tape rule housing in accordance with claim 1 wherein said housing side walls and peripheral wall are fabricated from synthetic resin.

7. The tape rule housing in accordance with claim 6 wherein said side walls and peripheral wall of said housing are provided by a pair of mating housing elements.

8. The tape rule housing in accordance with claim 7 wherein said housing elements are molded with said recessed portions in said side walls and peripheral wall in which said grip element is seated.

9. The tape rule housing in accordance with claim 8 wherein said grip element is comprised of a pair of cooperatively configured and dimensioned sections seated in said recessed portions and bonded thereto.

10. The tape rule housing in accordance with claim 9 wherein said grip sections are overmolded in said recessed portions of said housing elements.

11. A returnable tape rule housing comprising:

(a) side walls;

(b) a peripheral wall extending therebetween with a bottom portion, upper portion, front end portion, and rear end portion, said walls providing an internal chamber therewithin, said peripheral wall having an aperture therein communicating with said chamber at the juncture between said bottom portion and said front end portion for passage of a tape rule blade therethrough, the juncture between said side walls and said upper portion of said peripheral wall being generally convexly arcuate, said housing walls having recessed portions extending over-the upper section of said rear end portion and the rearward, portion of said peripheral wall an the adjacent portion of said side walls, said housing side wall and peripheral wall being fabricated from synthetic resin and being provided by a pair of mating housing elements; and (c) an elastomeric grip element seated in said recessed portions and extending over the upper section of said rear end portion and the rearward section of said upper portion of said peripheral wall and said adjacent portions of said side walls, and said grip element being adhesively bonded to said peripheral wall and side walls, said grip element having ribs extending transversely of said peripheral wall and spaced along the length thereof, said grip element providing a slip-resistant and comfortable gripping surface for the user's palm and thumb.

12. The tape rule housing in accordance with claim 11 wherein said grip sections are overmolded in said recessed portions of said housing elements.

13. The tape rule housing in accordance with claim 11 wherein said side walls have a textured grip surface extending over a portion thereof adjacent said bottom portion of said peripheral wall.

* * * * *